US012579288B1

(12) United States Patent
Ben Ami et al.

(10) Patent No.: US 12,579,288 B1
(45) Date of Patent: Mar. 17, 2026

(54) SYSTEM AND METHOD FOR UTILIZING AN AI BROWSER AGENT IN IDENTITY DISCOVERY AND MANAGEMENT

(71) Applicant: Linx Ltd., Tel Aviv (IL)

(72) Inventors: Amir Ben Ami, Nehalim (IL); Dror Hadas, Tel Aviv (IL); Matan Haimovitch, Tel Aviv (IL); Niv Goldenberg, Brooklyn, NY (US)

(73) Assignee: Linx Ltd., Tel Aviv (IL)

( * ) Notice: Subject to any disclaimer, the term of this patent is extended or adjusted under 35 U.S.C. 154(b) by 0 days.

(21) Appl. No.: 19/287,102

(22) Filed: Jul. 31, 2025

(51) Int. Cl.
 *G06F 21/62* (2013.01)

(52) U.S. Cl.
 CPC ................................... *G06F 21/62* (2013.01)

(58) Field of Classification Search
 CPC ............................... G06F 21/62; H04W 12/06
 See application file for complete search history.

(56) References Cited

U.S. PATENT DOCUMENTS

| | | | | |
|---|---|---|---|---|
| 7,146,512 | B2 * | 12/2006 | Rothman | .............. G06F 9/4401 |
| | | | | 713/320 |
| 7,634,800 | B2 * | 12/2009 | Ide | ......................... G06F 21/31 |
| | | | | 709/224 |
| 8,255,594 | B2 * | 8/2012 | De | ....................... G06F 9/4401 |
| | | | | 710/33 |
| 8,719,838 | B1 * | 5/2014 | Oakes, III | ............... G06F 21/31 |
| | | | | 719/311 |
| 10,063,594 | B2 * | 8/2018 | Winn | ................... H04L 63/0823 |
| 2009/0265708 | A1 * | 10/2009 | Nakajima | ........... G06F 9/45558 |
| | | | | 718/1 |
| 2010/0077461 | A1 * | 3/2010 | Nguyen | ................... G06F 21/41 |
| | | | | 726/5 |
| 2012/0131138 | A1 * | 5/2012 | Swenson | ............... H04W 12/06 |
| | | | | 709/217 |
| 2014/0047532 | A1 * | 2/2014 | Sowatskey | ............ G06F 21/445 |
| | | | | 726/10 |
| 2016/0134620 | A1 * | 5/2016 | Morrison | ................ H04W 4/80 |
| | | | | 726/6 |
| 2017/0118214 | A1 * | 4/2017 | Vainstein | ............ G06F 21/6218 |
| 2020/0374278 | A1 * | 11/2020 | Sundaram | ............. H04L 63/123 |
| 2022/0343010 | A1 * | 10/2022 | Ghafoor | .............. G06F 21/6218 |
| 2025/0252184 | A1 * | 8/2025 | Ben-Noon | .............. G06F 21/53 |

\* cited by examiner

*Primary Examiner* — Ponnoreay Pich
(74) *Attorney, Agent, or Firm* — M&B IP Analysts, LLC

(57) ABSTRACT

A system and method for utilizing an artificial intelligence (AI) browser agent to extract identity information for applying a cybersecurity control is presented. The method includes receiving access credentials to a software service, the software service including a plurality of associated identities; detecting in the software service each identity of the plurality of identities, and at least a metadata associated with each identity; generating for each detected identity a representation, the representation generated based on the associated at least a metadata; applying a control on the representation; and initiating an action in the software service, based on a result of applying the control on the representation.

19 Claims, 3 Drawing Sheets

SYSTEM AND METHOD FOR UTILIZING AN AI BROWSER AGENT IN IDENTITY DISCOVERY AND MANAGEMENT

TECHNICAL FIELD

The present disclosure relates generally to AI-driven web automation and data integration, specifically enabling secure, credentialed extraction of structured data from web applications lacking APIs, for use in enterprise systems.

BACKGROUND

Modern enterprise systems often rely on application programming interfaces (APIs) to enable data integration between applications and external services. API-based integration is efficient and scalable, and it forms the backbone of many modern SaaS ecosystems. However, numerous enterprise platforms either lack accessible APIs or do not provide them in a format that easily supports automated, secure integration. In these cases, companies often resort to manual processes such as downloading spreadsheets, reformatting data, and uploading it to internal systems. This approach is error-prone, inefficient, and not scalable.

This gap has spurred efforts to create alternative data ingestion mechanisms for non-API environments. However, these typically lack sophistication in dealing with authentication, dynamic content, or UI complexity and do not support enterprise-grade security or integration patterns.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include receiving access credentials to a software service, the software service including a plurality of associated identities. The method may also include detecting in the software service each identity of the plurality of identities, and at least a metadata associated with each identity. The method may furthermore include generating for each detected identity a representation, the representation generated based on the associated at least a metadata. The method may in addition include applying a control on the representation. The method may moreover include initiating an action in the software service, based on a result of applying the control on the representation. Other embodiments of this aspect include corresponding computer systems, apparatus, and computer programs recorded on one or more computer storage devices, each configured to perform the actions of the methods.

Implementations may include one or more of the following features. The method may include: initiating the action in a computing environment configured to access the software service. The method may include: generating the representation further based on an associated permission. The method may include: configuring an AI agent client to detect in the software service each identity utilizing the access credentials. The method may include: configuring the AI agent to further interact with the software service, where interacting with the software service includes simulating an user interaction with the software service. The method may include: configuring a plurality of AI agent clients to each interact with the software service; and generating the representation further based on a result of each interaction of the plurality of AI agent clients with the software service. The method may include: detecting in the metadata a permission; and generating the representation for each identity further based on the detected permission. The method may include: initiating the a remediation action in a computing environment having access to the software service. The method may include: continuously applying controls on the representation; and continuously updating the generated representation based on a result of applying the controls. Implementations of the described techniques may include hardware, a method or process, or a computer tangible medium.

In one general aspect, a non-transitory computer-readable medium may include one or more instructions that, when executed by one or more processing circuitries of a device, cause the device to: receive access credentials to a software service, the software service including a plurality of associated identities; detect in the software service each identity of the plurality of identities, and at least a metadata associated with each identity; generate for each detected identity a representation, the representation generated based on the associated at least a metadata; apply a control on the representation; and initiate an action in the software service, based on a result of applying the control on the representation. Other embodiments of this aspect include corresponding computer systems, apparatus, and computer programs recorded on one or more computer storage devices, each configured to perform the actions of the methods.

In one general aspect, system may include a processing circuitry. The system may also include a memory, the memory containing instructions that, when executed by the processing circuitry, configure the system to: receive access credentials to a software service, the software service including a plurality of associated identities. The system may in addition detect in the software service each identity of the plurality of identities, and at least a metadata associated with each identity. The system may moreover generate for each detected identity a representation, the representation generated based on the associated at least a metadata. The system may also apply a control on the representation. The system may furthermore initiate an action in the software service, based on a result of applying the control on the representation. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: initiate the action in a computing environment configured to access the software service. The system where the memory contains further instructions which when executed by the processing circuitry further configure the system to: generate the representation further based on an associated permission. The system where the memory contains further instructions which when executed by the processing circuitry further configure the system to: configure an AI agent client to detect in the software service each identity utilizing the access credentials. The system where the memory contains further instructions which when executed by the processing circuitry further configure the system to: configure the AI agent to further interact with the software service, where interacting with the software service includes simulating an user interaction with the software service. The system where the memory contains further instructions which when executed by the processing circuitry further configure the system to: configure a plurality of AI agent clients to each interact with the software service; and generate the representation further based on a result of each interaction of the plurality of AI agent clients with the software service. The system where the memory contains further instructions which when executed by the processing circuitry further configure the system to: detect in the metadata a permission; and generate the representation for each identity further based on the detected permission. The system where the memory contains further instructions which when executed by the processing circuitry further configure the system to: initiate the a remediation action in a computing environment having access to the software service. The system where the memory contains further instructions which when executed by the processing circuitry further configure the system to: continuously apply controls on the representation; and continuously update the generated representation based on a result of applying the controls. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
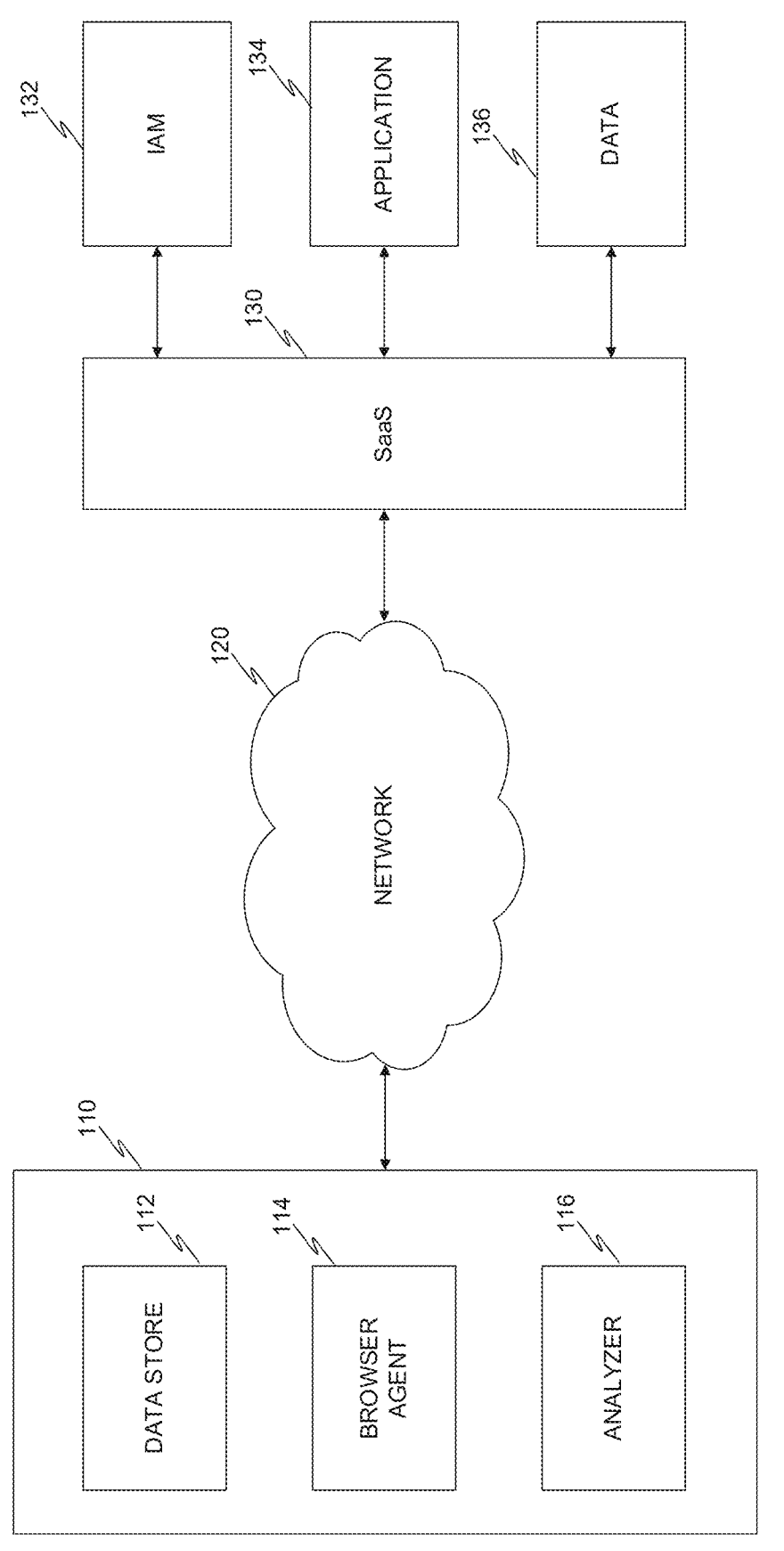
FIG. 1 is a schematic illustration of a networked computing environment utilizing identity based access control, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments include a method and system for integrating data from third-party web applications that do not expose APIs, using an autonomous, credentialed AI-driven browser agent. According to an embodiment, the agent is configured to function as a background process, performing secure and intelligent navigation through authenticated web interfaces, extracting relevant structured data, and submitting it to a destination service via a standard integration interface.

FIG. 1 is an example schematic illustration of a networked computing environment utilizing identity based access control, utilized to describe an embodiment. In an embodiment, an identity security platform 110 includes a data store 112, a browser agent 114, and an analyzer 116. An identity security platform 110 is discussed in more detail in U.S. patent application Ser. No. 18/806,918 titled "Techniques for Just-In-Time Context Based Permission Access of Computing Resources" and U.S. patent application Ser. No. 19/022,586 titled "System and Method for Identity Modeling and Effective Permission Management", assigned to the same assignee, all contents of which are hereby incorporated by reference.

According to an embodiment, a data store 112 is configured to store representations of identities, of permissions, of roles, various combinations thereof, and the like. In an embodiment, the representations are stored in a database of the data store 112. In some embodiments, the data store 112 is configured to store data extracted by a browser agent 114, enriched by an analyzer 116, a combination thereof, and the like.

In an embodiment, a software service, such as SaaS 130 includes an identity and access management (IAM) platform 132, a software application 134 (also referred to as application 134), data 136, a combination thereof, and the like. In some embodiments, the software service 130 does not include an API, or otherwise includes a limited API, whereby the identity security platform 110 is unable to receive identity information through an API call to the software service 130.

In an embodiment, the application 134 is configured to generate a web-based interface through which users having user accounts registered with the IAM platform 132 can interact with the application 134. In some embodiments, the IAM platform 132 is provided by a third party to the SaaS 130. In an embodiment, the IAM platform 132 is local to the SaaS 130. In some embodiments, the IAM platform 132 is provided by a third party, such as Okta®.

In certain embodiments, the application 134 is configured to generate a web-based interface, for example to access, manipulate, read, write, etc., the data 136. In an embodiment, the data 136 is stored in a data lake, a database, data warehouse, and the like.

In some embodiments, the SaaS 130 is exposed to a network 120. In an embodiment, the network 120 includes a wireless, cellular or wired network, a local area network (LAN), a wide area network (WAN), a metro area network (MAN), the Internet, the worldwide web (WWW), similar networks, and any combination thereof. According to an embodiment, the network 120 provides connectivity to various clients of the SaaS 130.

In an embodiment, the browser agent 114 is configured to enable ingestion of data from platforms such as payroll systems, enterprise tools, and the like, which lack programmatic access (e.g., via REST APIs). By leveraging an artificial intelligence (AI) model, the browser agent 114 is configured to interpret web page structures, handle dynamic content (e.g., scrolling, hover-based elements), and adapt to changes in HTML layout.

In some embodiments, the browser agent 114 is configured to request, receive, etc., access credentials which provide access to the SaaS 130. In an embodiment, the browser agent 114 is assigned a user account which is stored in the IAM platform 132.

In an embodiment, the browser agent 114 is configured to initiate autonomous navigation of a web interface of the application 134 to locate relevant information for the analyzer 116. In some embodiments, the browser agent 114 is configured to identify and extract user data from the application 134, such as user lists, permissions, and the like.

In certain embodiments, the browser agent 114 is configured to continuously upload detected data to an API endpoint, for example of the identity security platform 110. In an embodiment, the API endpoint points to the analyzer 116. According to an embodiment, the browser agent 114 includes a generative AI model configured to interpret web elements and generate navigation instructions which are transmitted to the application 134 of the SaaS 130.

For example, in an embodiment, the browser agent 114 is configured to extract a web page from the application 134. According to an embodiment, a generative AI model utilized by the browser agent 114 is configured to generate a generalized extraction logic for web pages which are similar to the extracted web page.

For example, where the application 134 includes a plurality of web pages, each corresponding to a unique employee, the browser agent 114 is configured to input an extracted web page of a specific user (e.g., a unique employee) to the generative AI model, and configure the generative AI model to output a script that extracts identity data from a web page which is designed in a similar fashion to the extracted web page. Thus, any web page of any unique user can be scraped for identity data.

In some embodiments, an analyzer 116 is configured to receive data from the browser agent 114 and store the data in a data store 112. In certain embodiments, the analyzer 116 is configured to enrich the extracted data. For example, in an embodiment, the analyzer 116 is configured to match an extracted identity of the IAM platform 132 to an existing representation of an identity in the data store 112. In an embodiment, where the analyzer 116 matches the identity to the representation of an identity in the data store 112, a connection is generated in the data store 112 between the representations of both identities.

Figure 2:
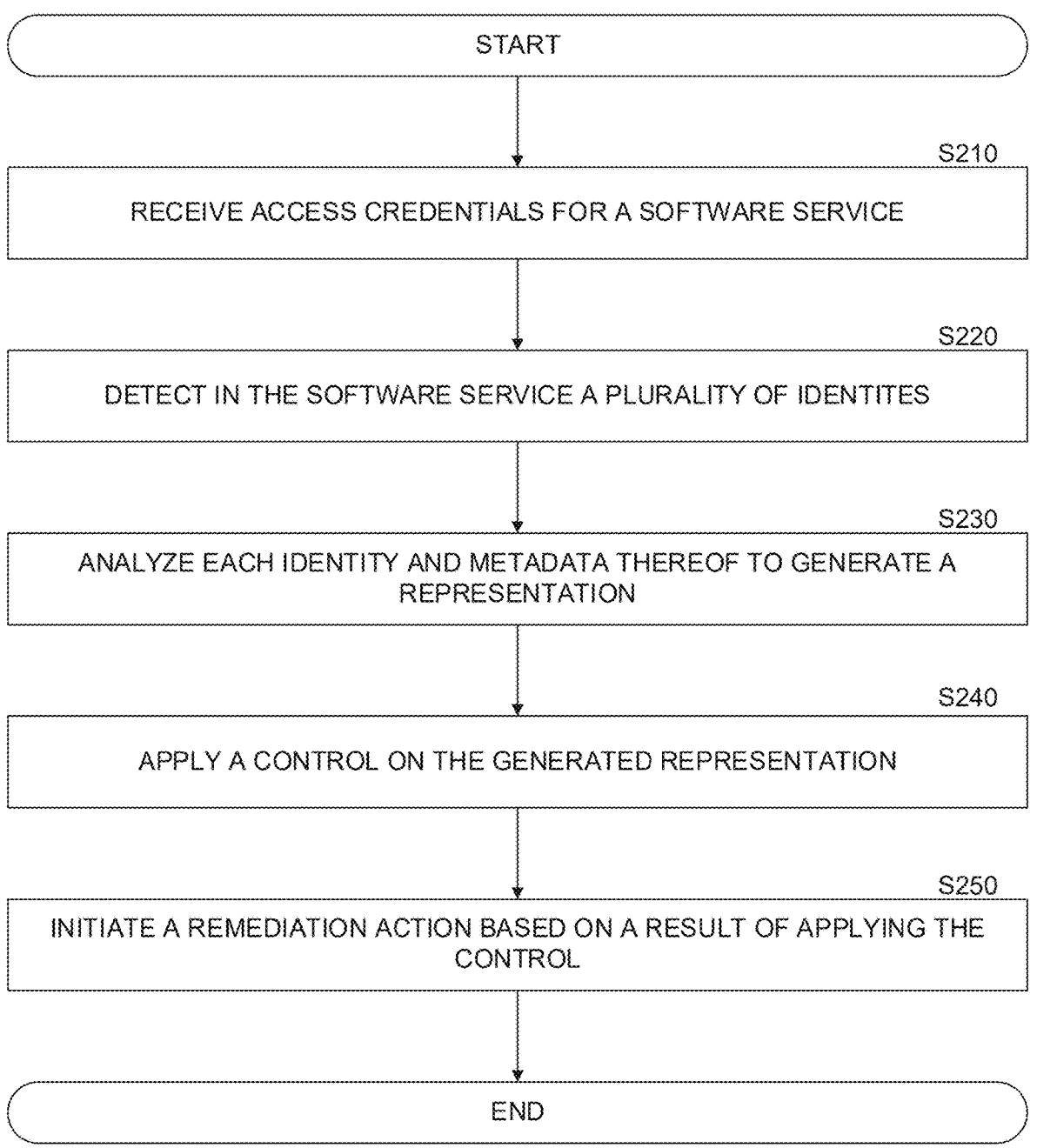
FIG. 2 is an example flowchart of a method for identity detection utilizing a browser agent, implemented in accordance with an embodiment.

FIG. 2 is an example flowchart of a method for identity detection utilizing a browser agent, implemented in accordance with an embodiment.

At S210, access credentials are received. In an embodiment, a browser agent is configured to receive access credentials through a secure configuration interface where an administrator inputs authentication details. According to an embodiment, access credentials include a username and password, a session token, OAuth tokens, a combination thereof, and the like, depending on the target system's (e.g., SaaS 130) login method.

For example, an enterprise admin logs into the integration dashboard and enters the login URL, username, and password for a third-party payroll system. The credentials are encrypted and stored securely. When the browser agent is launched, it is configured to retrieve the credentials, navigate to the login page of the SaaS 130, fill in the fields of the credentials, and submit the form to establish an authenticated session.

In some embodiments, for example where the system uses multi-factor authentication, the browser agent may prompt the user to complete the verification step during initial setup and store session cookies for subsequent runs. This enables secure, automated access to web interfaces that lack programmatic APIs.

At S220, a plurality of identities are detected. In an embodiment, the browser agent is configured to navigate to a specific page within the target web application where user identities are listed, such as an "Employee Directory" or "User Management" section.

According to an embodiment, the browser agent is configured to parse the HTML structure to identify repeated data blocks that represent individual identities, using patterns such as table rows, div containers, list elements, and the like.

In an embodiment, each identity includes fields such as full name, username, email address, role, access permissions, various combinations thereof, and the like. According to an embodiment, the browser agent is configured to extract this data. For example, the browser agent may be configured to identity a column labeled "User ID" and map the corresponding values across all rows. The browser agent is further configured to then associate each set of extracted fields as a discrete identity object. In an embodiment, to ensure coverage, the browser agent is configured to paginate through results, dynamically detecting "Next" or "Load More" buttons. All identities are collected into a structured format (e.g., JSON) for processing, for example by an analyzer.

At S230, each identity is analyzed. In an embodiment, the collected set of identities from the target system is analyzed by parsing associated metadata fields such as role, department, last login timestamp, account status, creation date, and the like. In an embodiment, an analyzer is configured to utilize these attributes to classify and enrich the extracted data.

For example, if an identity has no recorded login activity in the past 180 days and is assigned a privileged role (e.g., admin), the system is configured to flag it as a dormant high-risk account. In an embodiment, enrichments include mapping usernames to corporate directory records to attach manager hierarchy, office location, employment type, and the like. In some embodiments, role normalization is applied, where inconsistent titles (e.g., "System Owner" vs. "Admin") are mapped to standard access categories.

In certain embodiments, permissions data, such as access to financial systems, HR data, production environments, and the like, allow deriving risk scores. For example, an identity with access to multiple sensitive systems but lacking multi-factor authentication triggers a compliance alert, according to an embodiment. Additionally, grouping users by permission overlap can identify potential over-provisioning or segregation-of-duty violations.

In some embodiments, generated insights are compiled into reports. In certain embodiments, generated insights are fed into dashboards showing metrics such as number of orphaned accounts, distribution of privileged roles, accounts with excessive access, anomalies (e.g., inactive users with persistent high-level access), various combinations thereof, and the like. In an embodiment, an insight is generated based on a result of analyzing an identity, metadata of an identity, a permission of an identity, a combination thereof, and the like.

At S240, a control is applied. In an embodiment, a control includes a conditional rule applied to a detection, enrichment, insight, and the like. For example, an identity with access to multiple sensitive systems but lacking multi-factor authentication (e.g., a detection and enrichment) triggers a compliance alert. In some embodiments, controls are applied continuously as data is received from the browser agent, the analyzer, and the like.

At S250, a remediation action is initiated. In an embodiment, the remediation action is initiated by the browser agent. For example, if a user account is identified as dormant for over 90 days with elevated permissions, the browser agent is configured, according to an embodiment, to trigger a deactivation workflow via the IAM platform of the SaaS. In an embodiment, for accounts with expired credentials or lacking MFA, the browser agent is configured to enforce policy updates by pushing configuration changes that require password reset or MFA enrollment at next login.

In some embodiments, for example where the SaaS is accessible to a cloud environments, such as Amazon® Web Services (AWS), where an identity is found with over-provisioned IAM roles, the browser agent is configured to generate a least-privilege policy and utilize the cloud provider's API to update the user's role assignments. This allows applying a remediation in a computing environment which is adjacent to the SaaS, but is not the SaaS itself. For example, by restricting the user account in AWS, there may be no need to place a restriction on a corresponding user account of the SaaS.

Figure 3:
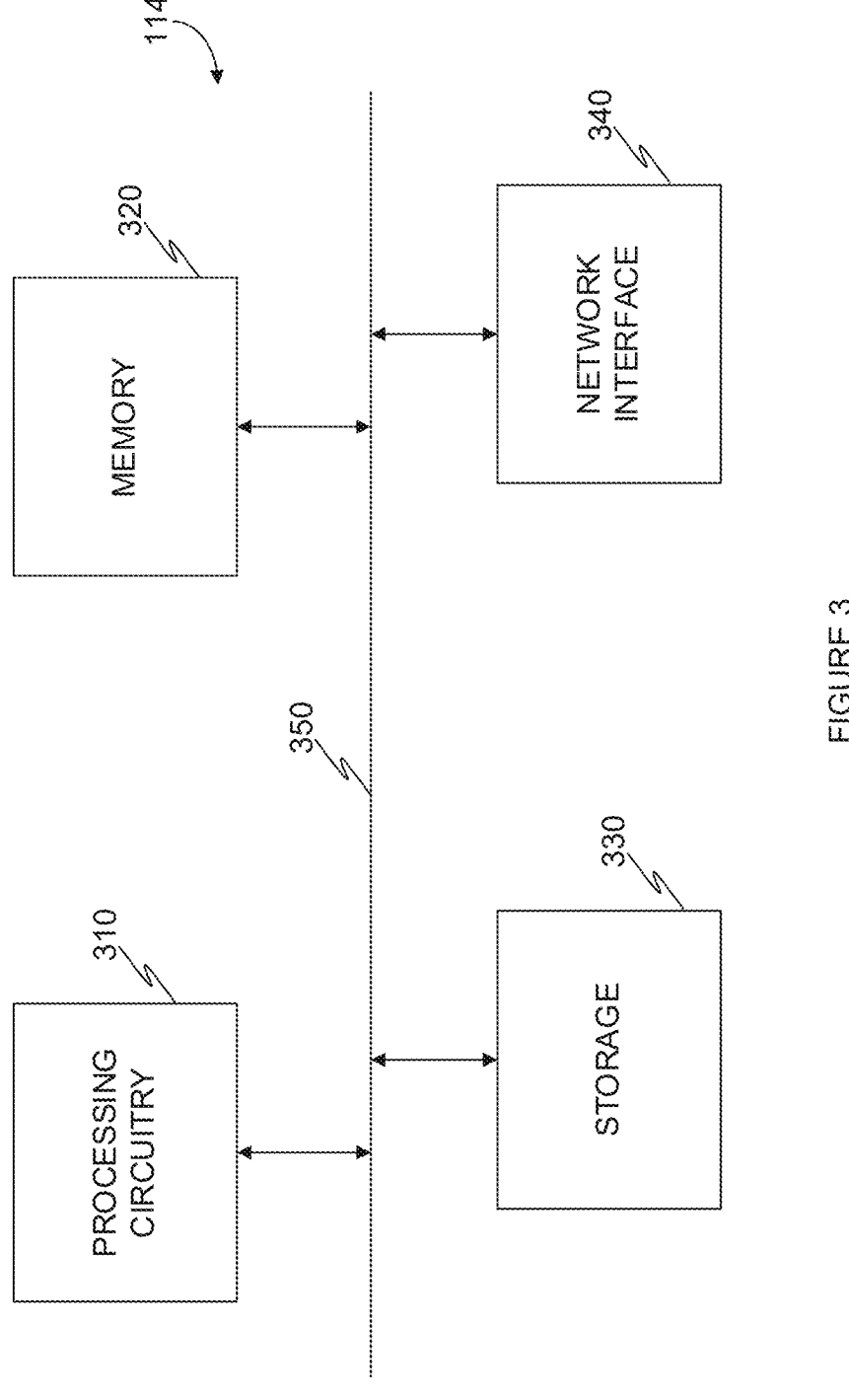
FIG. 3 is an example schematic diagram of a analyzer according to an embodiment.

FIG. 3 is an example schematic diagram of a analyzer 116 according to an embodiment. The analyzer 116 includes, according to an embodiment, a processing circuitry 310 coupled to a memory 320, a storage 330, and a network interface 340. In an embodiment, the components of the analyzer are communicatively connected via a bus 350.

In certain embodiments, the processing circuitry 310 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 320 is a volatile memory (e.g., random access memory, etc.), a non-volatile memory (e.g., read only memory, flash memory, etc.), a combination thereof, and the like. In some embodiments, the memory 320 is an on-chip memory, an off-chip memory, a combination thereof, and the like. In certain embodiments, the memory 320 is a scratch-pad memory for the processing circuitry 310.

In one configuration, software for implementing one or more embodiments disclosed herein is stored in the storage 330, in the memory 320, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 310, cause the processing circuitry 310 to perform the various processes described herein, in accordance with an embodiment.

In some embodiments, the storage 330 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 340 is configured to provide the analyzer 116 with communication with, for example, the browser agent 114, the data store 112, the network 120, a combination thereof, and the like, according to an embodiment.

It should be understood that the embodiments described herein are not limited to the specific architecture illustrated in FIG. 3, and other architectures may be equally used without departing from the scope of the disclosed embodiments.

Furthermore, in certain embodiments the data store 112, the browser agent 114, the analyzer 116, a combination thereof, and the like, may be implemented with the architecture illustrated in FIG. 3. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for utilizing an artificial intelligence (AI) browser agent to extract identity information for applying a cybersecurity control, comprising:

receiving access credentials to a software service, the software service including a plurality of associated identities;

detecting in the software service each identity of the plurality of identities, and at least a metadata associated with each identity;

generating for each detected identity a representation, the representation generated based on the associated at least a metadata;

applying a control on the representation; and initiating an action in the software service, based on a result of applying the control on the representation.

2. The method of claim 1, further comprising:

initiating the action in a computing environment configured to access the software service.

3. The method of claim 1, further comprising:

generating the representation further based on an associated permission.

4. The method of claim 1, further comprising:

configuring an AI agent client to detect in the software service each identity utilizing the access credentials.

5. The method of claim 4, further comprising:

configuring the AI agent to further interact with the software service, wherein interacting with the software service includes simulating a user interaction with the software service.

6. The method of claim 4, further comprising:

configuring a plurality of AI agent clients to each interact with the software service; and generating the representation further based on a result of each interaction of the plurality of AI agent clients with the software service.

7. The method of claim 1, further comprising:

detecting in the metadata a permission; and generating the representation for each identity further based on the detected permission.

8. The method of claim 1, further comprising:

initiating the action in a computing environment having access to the software service.

9. The method of claim 1, further comprising:

continuously applying controls on the representation; and continuously updating the generated representation based on a result of applying the controls.

10. A non-transitory computer-readable medium storing a set of instructions for utilizing an artificial intelligence (AI) browser agent to extract identity information for applying a cybersecurity control, the set of instructions comprising:

one or more instructions that, when executed by one or more processing circuitries of a device, cause the device to:

receive access credentials to a software service, the software service including a plurality of associated identities;

detect in the software service each identity of the plurality of identities, and at least a metadata associated with each identity;

generate for each detected identity a representation, the representation generated based on the associated at least a metadata;

apply a control on the representation; and initiate an action in the software service, based on a result of applying the control on the representation.

11. A system for utilizing an artificial intelligence (AI) browser agent to extract identity information for applying a cybersecurity control comprising:

a processing circuitry;

a memory, the memory containing instructions that, when executed by the processing circuitry, configure the system to:

receive access credentials to a software service, the software service including a plurality of associated identities;

detect in the software service each identity of the plurality of identities, and at least a metadata associated with each identity;

generate for each detected identity a representation, the representation generated based on the associated at least a metadata;

apply a control on the representation; and initiate an action in the software service, based on a result of applying the control on the representation.

12. The system of claim 11, wherein the memory contains further instructions which when executed by the processing circuitry further configure the system to:

initiate the action in a computing environment configured to access the software service.

13. The system of claim 11, wherein the memory contains further instructions which when executed by the processing circuitry further configure the system to:

generate the representation further based on an associated permission.

14. The system of claim 11, wherein the memory contains further instructions which when executed by the processing circuitry further configure the system to:

configure an AI agent client to detect in the software service each identity utilizing the access credentials.

15. The system of claim 14, wherein the memory contains further instructions which when executed by the processing circuitry further configure the system to:

configure the AI agent to further interact with the software service, wherein interacting with the software service includes simulating a user interaction with the software service.

16. The system of claim 14, wherein the memory contains further instructions which when executed by the processing circuitry further configure the system to:

configure a plurality of AI agent clients to each interact with the software service; and generate the representation further based on a result of each interaction of the plurality of AI agent clients with the software service.

17. The system of claim 11, wherein the memory contains further instructions which when executed by the processing circuitry further configure the system to:

detect in the metadata a permission; and generate the representation for each identity further based on the detected permission.

18. The system of claim 11, wherein the memory contains further instructions which when executed by the processing circuitry further configure the system to:

initiate the action in a computing environment having access to the software service.

19. The system of claim 11, wherein the memory contains further instructions which when executed by the processing circuitry further configure the system to:

continuously apply controls on the representation; and continuously update the generated representation based on a result of applying the controls.

* * * * *